(12) United States Patent
Mikan et al.

(10) Patent No.: US 10,433,145 B2
(45) Date of Patent: Oct. 1, 2019

(54) SYSTEM AND METHOD FOR DEVICE-BASED E911 CALL TRIGGER

(71) Applicant: AT&T Intellectual Property I, LP., Atlanta, GA (US)

(72) Inventors: Jeffrey Mikan, Atlanta, GA (US); Min Lu, Holmdel, NJ (US); Feza Buyukdura, Fairview, TX (US); Russell Sharples, East Windsor, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/852,686

(22) Filed: Dec. 22, 2017

(65) Prior Publication Data

US 2019/0200205 A1  Jun. 27, 2019

(51) Int. Cl.
*H04W 4/90* (2018.01)
*H04M 3/42* (2006.01)
*H04M 11/04* (2006.01)

(52) U.S. Cl.
CPC ......... *H04W 4/90* (2018.02); *H04M 3/42195* (2013.01); *H04M 11/04* (2013.01)

(58) Field of Classification Search
CPC ................................ H04W 4/90; H04M 11/04
See application file for complete search history.

(56) References Cited

U.S. PATENT DOCUMENTS

| | | | |
|---|---|---|---|
| 6,249,674 B1* | 6/2001 | Verdonk | H04M 3/42195 455/404.1 |
| 7,190,947 B2 | 3/2007 | Binzel et al. | |
| 8,244,204 B1* | 8/2012 | Chen | H04M 3/42195 379/114.28 |
| 8,565,714 B2 | 10/2013 | Patel | |
| 8,588,732 B2 | 11/2013 | Jayanna | |
| 8,693,976 B2* | 4/2014 | Kasmi | H04W 76/50 455/404.1 |
| 8,938,209 B2 | 1/2015 | Crawford et al. | |
| 8,965,325 B2* | 2/2015 | Li | H04M 3/42195 379/37 |
| 9,008,043 B2 | 4/2015 | Sun et al. | |
| 9,148,769 B2 | 9/2015 | Mahendran | |
| 9,185,216 B2 | 11/2015 | Purnadi et al. | |
| 9,521,534 B2* | 12/2016 | Wawrowski | H04W 4/50 |
| 2007/0003024 A1* | 1/2007 | Olivier | H04M 7/1205 379/45 |
| 2007/0152877 A1* | 7/2007 | Madhaven | G01C 21/12 342/357.23 |
| 2008/0214141 A1 | 9/2008 | Burdick et al. | |
| 2009/0253400 A1* | 10/2009 | Jayanna | H04M 3/42195 455/404.1 |
| 2010/0056099 A1* | 3/2010 | Kazmi | H04W 76/50 455/404.1 |
| 2011/0173678 A1* | 7/2011 | Kaippallimalil | G06F 21/31 726/4 |
| 2011/0307500 A1* | 12/2011 | Li | H04L 67/24 707/755 |

(Continued)

*Primary Examiner* — Babar Sarwar
(74) *Attorney, Agent, or Firm* — BakerHostetler

(57) ABSTRACT

A method includes initiating an emergency call, responsive to the initiating step, generating a trigger, wherein the trigger comprises a request to suspend a call restriction associated with a user device, and transmitting the trigger using a Ut interface to a server to suspend the call restriction.

12 Claims, 16 Drawing Sheets

(56) References Cited

U.S. PATENT DOCUMENTS

| | | | |
|---|---|---|---|
| 2013/0137408 A1* | 5/2013 | Buschner | H04Q 3/0029 455/415 |
| 2014/0370834 A1 | 12/2014 | Liu et al. | |
| 2016/0021523 A1 | 1/2016 | Mahendran | |
| 2016/0100435 A1 | 4/2016 | Bakker et al. | |
| 2017/0196026 A1* | 7/2017 | Daoud | H04W 4/021 |
| 2017/0223515 A1* | 8/2017 | Mutikainen | H04W 4/90 |

* cited by examiner

SYSTEM AND METHOD FOR DEVICE-BASED E911 CALL TRIGGER

TECHNICAL FIELD

Embodiments of the present inventions relate to methods and systems for providing the ability for E911 callback and more particularly, to methods and systems for providing for E911 callback while other call restrictions are in place.

BACKGROUND

Wireless communications with Public Safety Access Points (PSAPs) continue to evolve. For a variety of reasons, an inbound call from a user device to a PSAP may be terminated, either accidentally or purposefully. In such a case, there is a need for the PSAP to issue a return call to the user device.

Under normal conditions where no call or access restrictions are in place, callbacks from a PSAP to a user device are relatively straight forward. However, this is not the case if there are access restrictions on the user device. For example, a call made to a PSAP from a mobile device having parental controls with respect to incoming calls may not be completed. As more and more services are being developed for the IP Multimedia System (IMS), there is no standard way to apply access restrictions based on parental controls, time of day, unavailability, quiet time or other implementations of "do not disturb" functionality. This is because any time these restrictions are in place, there is the potential that a call-back from a Public Safety Access Point (PSAP) may be blocked.

Thus, there is a need to create a system and method such that any call restrictions may be put in place yet still permit a callback from a PSAP to a user device to be completed.

SUMMARY

The present disclosure is directed to a method including initiating an emergency call, responsive to the initiating step, generating a trigger, wherein the trigger comprises a request to suspend a call restriction associated with a user device, and transmitting the trigger using a Ut interface to a server to suspend the call restriction. The trigger may be incorporated into an XCAP message. The method may further include receiving a response from the server wherein the response comprises a time period wherein the call restriction is enabled at the end of the time period. The trigger may be transmitted at one of a beginning of the emergency call, during the emergency call and at an end of the emergency call and the time period may be measured from the one of the beginning of the emergency call, during the emergency call and at the end of the emergency call. The server may be a commercial network node.

The disclosure is also directed to an apparatus including an input/output system for communicatively coupling the apparatus to an input device, a processor communicatively coupled to the input/output system, and a memory storing instructions that cause the processor to effectuate operations when executed, the operations including initiating an emergency call, responsive to the initiating step, generating a trigger, wherein the trigger comprises a request to suspend a call restriction associated with a user device and transmitting the trigger using a Ut interface to a server to suspend the call restriction. In an aspect, the operations may further include receiving a response from the server wherein the response comprises a time period and wherein the call restriction is enabled at the end of the time period. The trigger may be transmitted at one of a beginning of the emergency call, during the emergency call and at an end of the emergency call and the time period is measured from the one of the beginning of the emergency call, during the emergency call and at the end of the emergency call.

The disclosure is also directed to a method including receiving a message from a user device over a Ut interface wherein the message comprises a trigger, responsive to the receiving step, causing a call restriction to be disabled, sending a response message to the user device wherein the response message comprises a time period and re-enabling the call restriction at the conclusion of the time period. The method may further include logging an identification of the user device into a caller log and wherein the call restriction is suspended is received from the user device.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Overview.

The present disclosure includes systems and methods for a adding a message to the Ut standard in order to override restrictions on a user device receiving incoming calls or data messages. The Ut protocol provides direct link between the device and the Commercial Network Node (MMTel) that may be used to set restrictions. The system and method of the present invention may also include a forwarding function to other application services such as, for example, messaging services, such that any restrictions on those services may also be removable for a period of time.

The present disclosure is applicable to voice and messaging, but could be expanded to apply to services that only apply to PSAP services. For example, the present disclosure may provide the ability for a PSAP to auto trigger an E911 camera. The technology may only allow this trigger to be passed to the user device if the user device had called 911 within a specific period of time, for example, the last hour. If the PSAP sent this at any other time, the network would remove the trigger since the commercial network knows whether the user had just called 911. In addition to the device based solution, in an aspect, the system and method of the present disclosure may include enabling the emergency network to trigger the restriction removal, a benefit of which would be to avoid any new device requirements.

System Environment.

Figure 1:
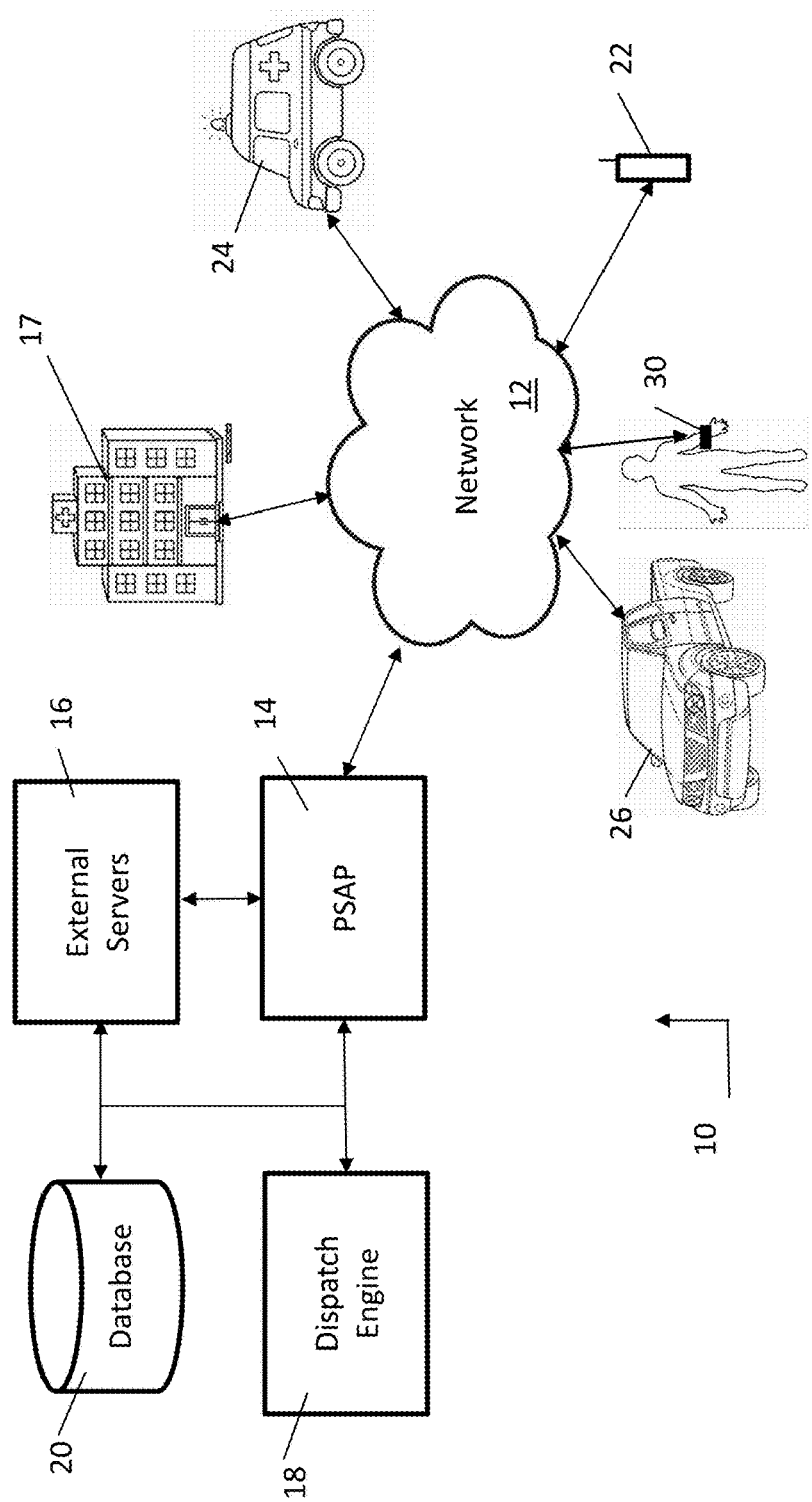
FIG. 1 is a representation of an exemplary operating environment for a Public Safety Access Point (PSAP) in communication with first responder vehicles and an emergency application in a connected vehicle, an individual accident victim, and/or smartphone.

With reference to FIG. 1, there is shown a system 10 in which the present disclosure may operate. Central to the system is network 12, which may be a combination of wireless and/or wired network communication systems. The network 12 may include components of the Public Switched Telephone Network (PSTN) as well as wireless network systems including 3G, 4G/LTE, 5G, WiFi, WiMAX, and any other wireless network communications system now known or to be developed in the future. The network 12 and voice and data communications across the network 12 is generally known by those skilled in the art.

In communication with the network 12 may be a PSAP gateway 14. Functionally, the PSAP gateway 14 can be any type of server located at PSAP, a hospital or urgent care center, a third party service provider, a wireless service provider, or any other remote entity that provides a server. The server may be discrete or reside in a cloud-based operational environment. For the exemplary purposes of this written description, PSAP server 14 or PSAP gateway 14 will be used interchangeably to refer to such a remote server.

The PSAP gateway 14 may be in communication with database 20. The database 20 may be local or reside in a cloud-based environment. The database 20 may include maps of roads and other transportation infrastructure, an identification of first responder ambulatory vehicles and their capabilities and locations, any other data which may be relevant to the systems and methods of the present disclosure.

Database 20 may also include a history of voice and data communications relating to emergency calls, including such communications with emergency callers, first responders, hospitals or other care facilities, or any other PSAP communications. Additionally, database 20 may include other information for the PSAP gateway 14 to access, including for example, locations, capacities and capabilities of care centers including hospitals, emergency rooms, doctors, heliports, nursing homes, temporary or permanent shelters, trauma units or any other location wherein a patient may obtain medical care. For each such care location, there may be stored in database 20 the capabilities or specialties available at each care location, including for example, trauma centers, surgical capabilities, first aid, orthopedics, x-rays, burn specialists or any other type of medical specialty or capability.

Continuing with the description of the operating environment in FIG. 1, the PSAP server 14 may be in communication with external servers 16 to obtain additional information. External servers may, for example, provide access to other data and programs not contained within the PSAP server 14 or other servers or database 20. For example, such additional information may include, but is not limited to, real time traffic reports and conditions, weather conditions, patient health records, or any other externally generated information which may be useful to the provision of emergency services.

The PSAP server 14 or other server may control or otherwise facilitate communications to and from the user device 22, a wearable communications device 30 on a person, a connected vehicle 26, a first responder ambulatory vehicle 24, PSAP personnel, and care facilities 17 and any other network connected devices. The functionality embedded and described in the disclosure may reside either on the user device 22, the network 12, or the PSAP server 14 or a combination thereof. Such designation of functionality may be based on user experience, performance, cost, or any other factor. The allocation of functionality is exemplary only and non-limiting in scope of the present disclosure.

Figure 2:
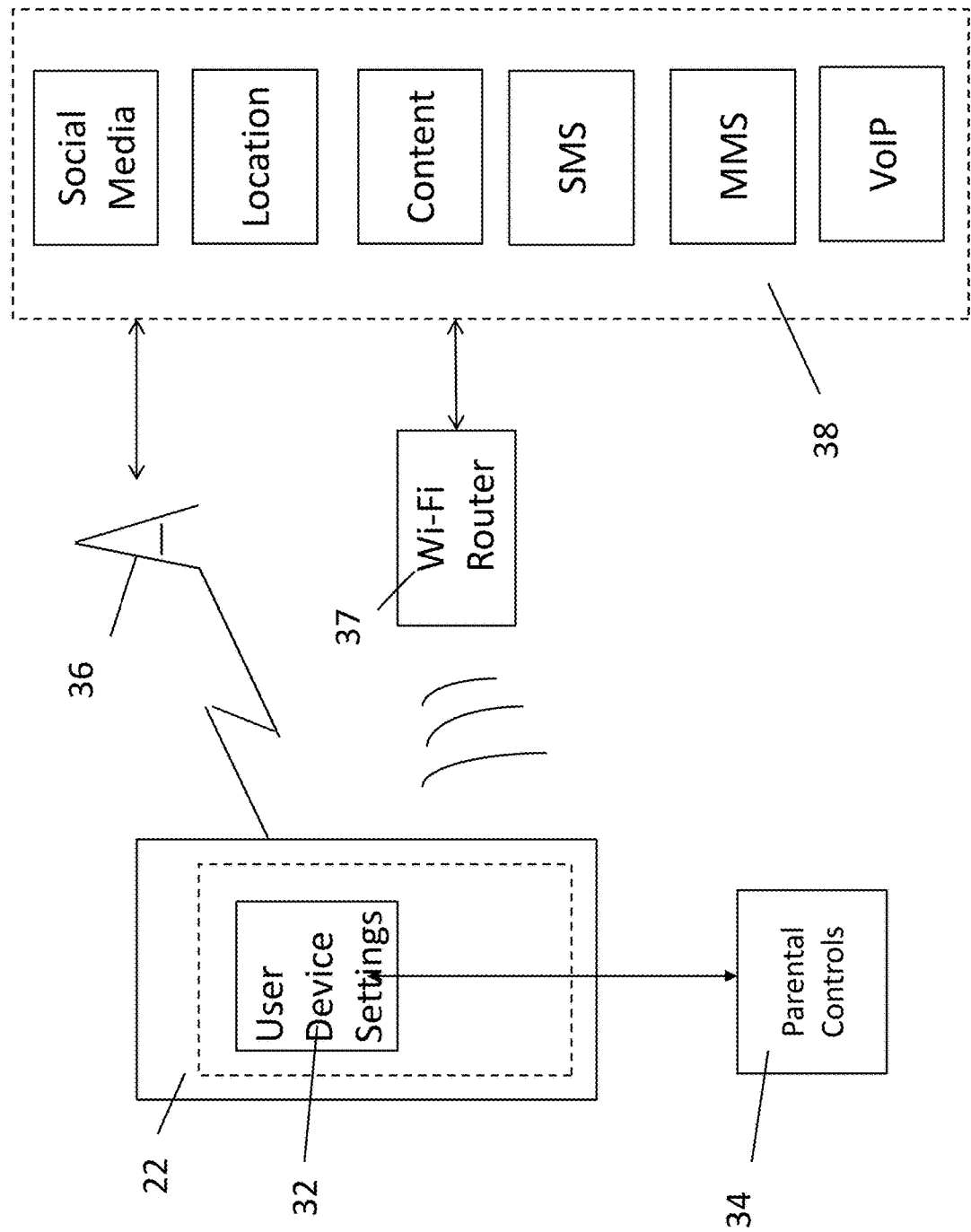
FIG. 2 is a functional block diagram of an exemplary user device in communication with systems including a parental control system.

FIG. 2 illustrates user device 22 which may, for example, include local functionality for user device settings 32. As is known by those skilled in the art, user device 22 may communicate wirelessly using the wireless network 12 either using one of the cellular protocols through antenna 36 or over wi-fi router 37 or any other communications interface. The user device 22 may be able to access functions 38 available in or through the network 12, such as, for example, social media, location based services, external content, short-message services (SMS), multi-media services (MMS), voice of internet protocol, or any other external content or communications functionality.

Also shown in FIG. 2 is a parental controls function 34. Parental controls 34 may include, for example, time of day, daily, weekly, monthly or other restrictions on incoming or outgoing voice or data communications, lists of permitted communications, lists of prohibited communications, and any combination of the foregoing. Other parental controls may, for example, include operation only within or outside certain locations, daily, weekly or monthly limits of use (i.e., cellular data plans) or any other restrictions that may be placed on the otherwise unlimited use of user device 22. It should also be understood that while the example of parental controls 34 is used in this disclosure, the disclosure is not limited to only parental controls 34 but rather is applicable to any restrictions invoked on the user device 22. For example, the systems and methods described herein may be applicable to location based restrictions, for example, within a secure facility, a concert, or any other location in which use of a user device 22 may be restricted. The systems and methods of the present disclosure may also be applicable to any other time of day restrictions, caller or calling restrictions or any other restrictions regardless of the source or impetus behind those restrictions.

While FIG. 2 shows parental controls 34 as a stand-alone function, it should be noted that the parental controls 34 may be implemented by an application server in the network 12, which may, for example, be the exemplary network is described in greater detail below. Such parental controls 34 may be input by an interface to the server 34 which may, for example, be a web interface accessible by an authorized user. In an aspect, the parental controls 34 may also be entered directly into the user device 22. The restrictions placed on the user device 22 may be locally stored in the user device settings 32 or the parental controls 34 server in network 12 or any combination of the two.

Figure 3:
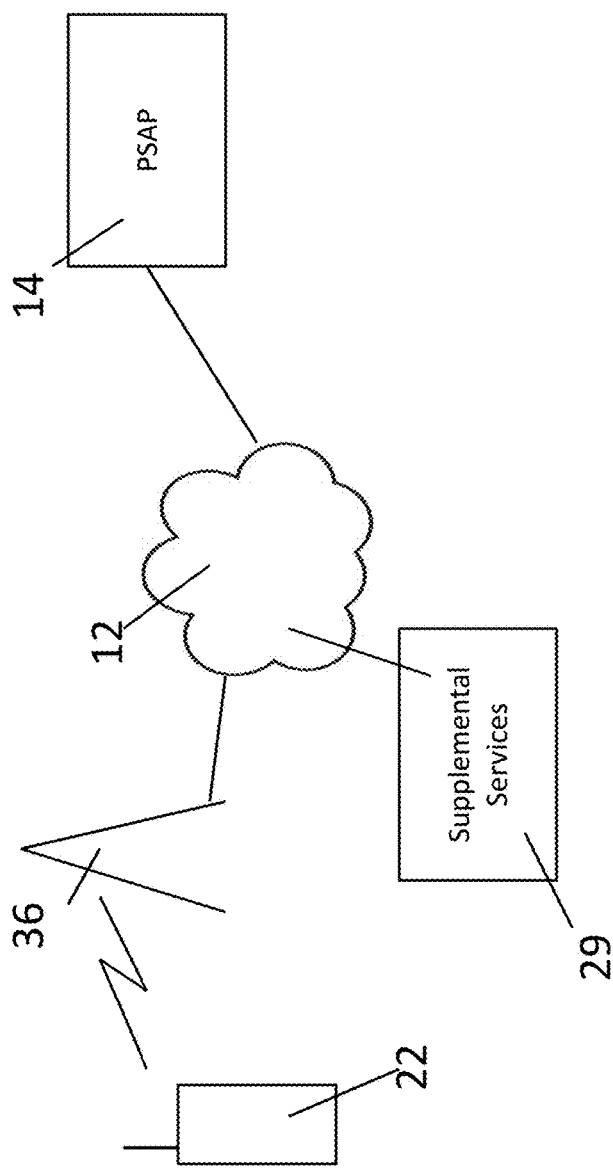
FIG. 3 is a simplified architecture diagram showing a communication path from a user device to a PSAP and the available in the network for supplemental services.

With reference to FIG. 3, there is shown an exemplary communication architecture between user device 22 and PSAP 14 across network 12. Added to this architecture is a functional block relating to supplemental services 29 available in the network 12. Such supplemental services 29 may include, for example, parental controls 34 or other restrictions on receipt of incoming calls or data. When a user device 22 dials 911, the call may trigger the suspension or disablement of supplemental services 29, which may, for example, include the suspension or disablement of call restrictions.

System Architecture.

Figure 4:
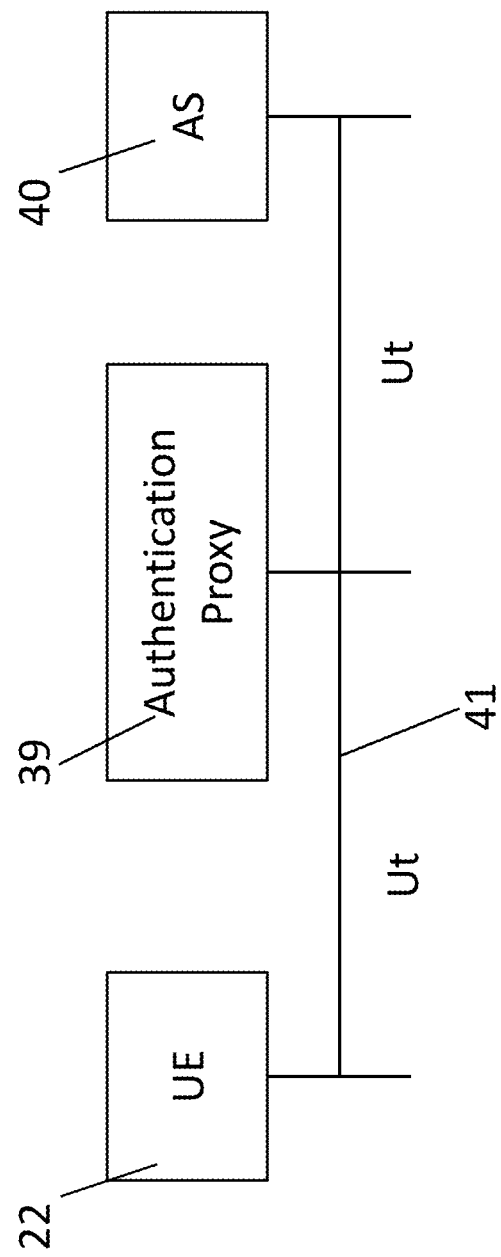
FIG. 4 is an illustration of an exemplary communication path between a user device and an application server using the Ut interface.

FIG. 4 illustrates an exemplary architecture of the Ut interface 41 between a user device 22 and an application server 40 in which the user device 22 can request the suspension of some or all of the supplemental services 29 such as call restrictions. In an aspect, application server 40 may be commercial network node (MMTel) and which may be used to set, implement and enforce restrictions on user device 22. Other application servers 40 are also contemplated by the present disclosure, including but not limited to, for example, messaging servers such as multi-media system (MMS) servers and short messaging system (SMS) servers. While not required, an authentication proxy server 39 may be included in the Ut interface between user device 22 and application server 40. As such, authentication of the user device 22 using HTTP may take place directly at the application server 40 or with the support of the authentication proxy server 39. If an authentication proxy server 39 is used, once authentication is performed, messages from the user device 22 will be passed through the authentication proxy server 39 and the fully qualified domain name (FQDN) of the application server 40 is configured such that the authentication proxy server 39 forwards the HTTP requests to the designated application server 40.

Figure 5:
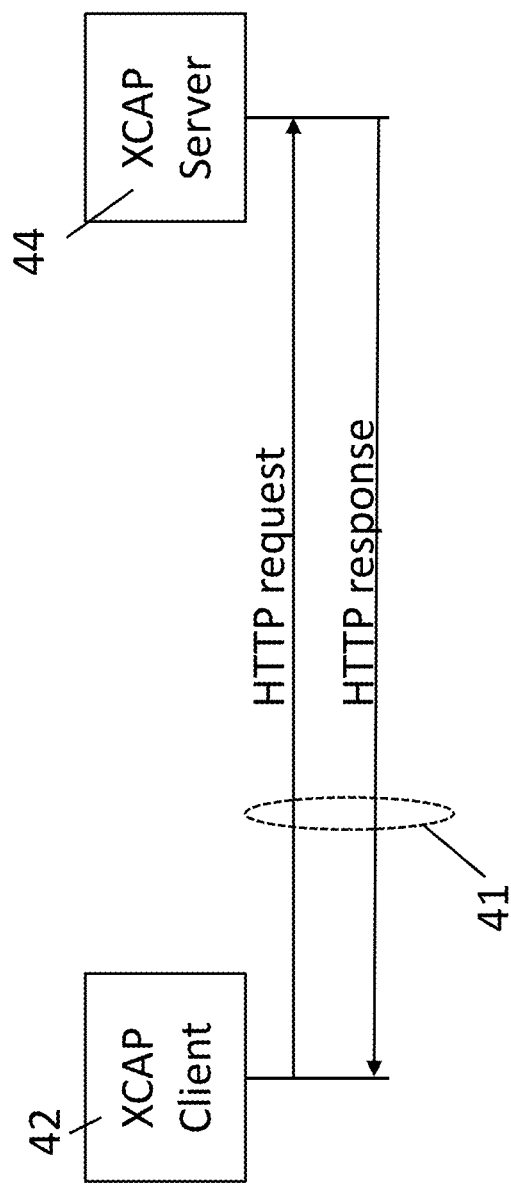
FIG. 5 is an illustration of an exemplary communication path between an XCAP client and XCAP server in accordance with the present disclosure.

FIG. 5 illustrates and exemplary message request using the HyperText Transfer Protocol (HTTP). In this exemplary case, the user device 22 is configured as an XML Configuration Access Protocol (XCAP) client and the application server 40 is configured as an XCAP server 44. The communication between the two using HTTP is illustrated by the HTTP request message and the HTTP response message going across the Ut interface 41. As an example, the HTTP request message may include an identity of the user device 22 that will be used with the application server 40.

The above-example illustrates a one-to-one mapping between user device 22 and application server 40. It will be understood that the Ut interface can send an XCAP message to multiple destinations or broadcast that XCAP message.

The XCAP client 42 may provide the means to manipulate data such as the configuration settings relating to supplementary services. The XCAP server 44 may store data related to the configuration of supplementary services. It will be noted that the full scope of the functionality of the XCAP client 42 and XCAP server 44 may be found in technical specification ETSI TS 124 623 v.9.2.0 (2010 January) and documents cited therein, all of which is hereby incorporated by reference.

In accordance with the present disclosure, there is a new and unique XML command in accordance with the XCAP protocol. Generally, SMPL commands may include retrieval, deletion, addition, or a modification of an item. Such command structure in this instance may, for example, include a deletion or modification message destined to the application server 40, for example, the MMTel server, which instructs the application server 40 to delete any call restrictions associated with a user device 22 or to modify any call restrictions associated with the user device to permit incoming calls from a PSAP 14 or other emergency personnel. The deletion or modification may be permanent or may be temporary based on a particular amount of time. For example, if there is a restriction in place that prevents incoming calls to a user device 22 from 9 pm to 9 am, a deletion or modification message sent to application server 40 may remove all restrictions for incoming calls for the duration of the restricted period. Alternatively, a deletion or modification message to server 40 may include a time period during which the restrictions on incoming calls would be removed. Such time period may, for example, be set to 1 hour which may be determined from the initiation of a 911 call or the termination of a 911 call.

Operation.

The system and method of the present invention may be controlled at a subscriber level. In an aspect, the system and method of the present disclosure may include a trigger that is generated any time 911, 112 or any other emergency number is dialed from user device 22. For the purposes of this disclosure, emergency calling using 911 will be used as the non-limiting example. In addition to a voice call based on dialing 911, a text message to 911 may be used to unblock voice, text and/or video services. The trigger may invoke the generation of a communication session across the Ut interface between user device 22 and application server 40. The trigger may be selective in that it is only generated in the event that call restrictions are currently in place. Alternatively, the trigger may occur any time 911 or other emergency number is dialed. Once that communication session is instantiated, a unique XML command may be sent to application server 40 to temporarily disable restrictions that would otherwise prevent an incoming call from PSAP 14 to user device 22. In an aspect, the Ut Message triggering the suspension of supplementary services may occur at the start of a call to 911. In another aspect, the Ut Message triggering the suspension of supplementary services may occur at the end of a call to 911. This may be beneficial in the event there is a longer call to 911 which would allow the suspension to start later and if the suspension is timed, then the suspension of supplementary services may end longer and still provide the overall suspension time period desired. In yet another aspect, the Ut Message may be sent periodically with the user device 22 retrying or regenerating the Ut Message at set intervals or a-periodically during the 911 call.

On the call back to a user device 22 from a PSAP 14, the PSAP 14 may log the number of the user device 22. In that way, the network may automatically permit return calls anytime that particular user device 22 calls 911 even if the trigger is not present.

There may be time durations during which the supplementary services are suspended, which may, for example, be 1 hour or 90 minutes. The Ut response may include this time period. This would allow for settings such as Do Not Disturb or other applications to be overridden only for PSAP calls. The network may provide the override time to the user device 22 so that the user device 22 may track that time period once the call to 911 is completed.

It will also be noted that the override of the disablement of supplemental services may include overriding any charging or low balance issues that may affect the receipt of incoming calls, for example, on prepaid plans.

Figure 6:
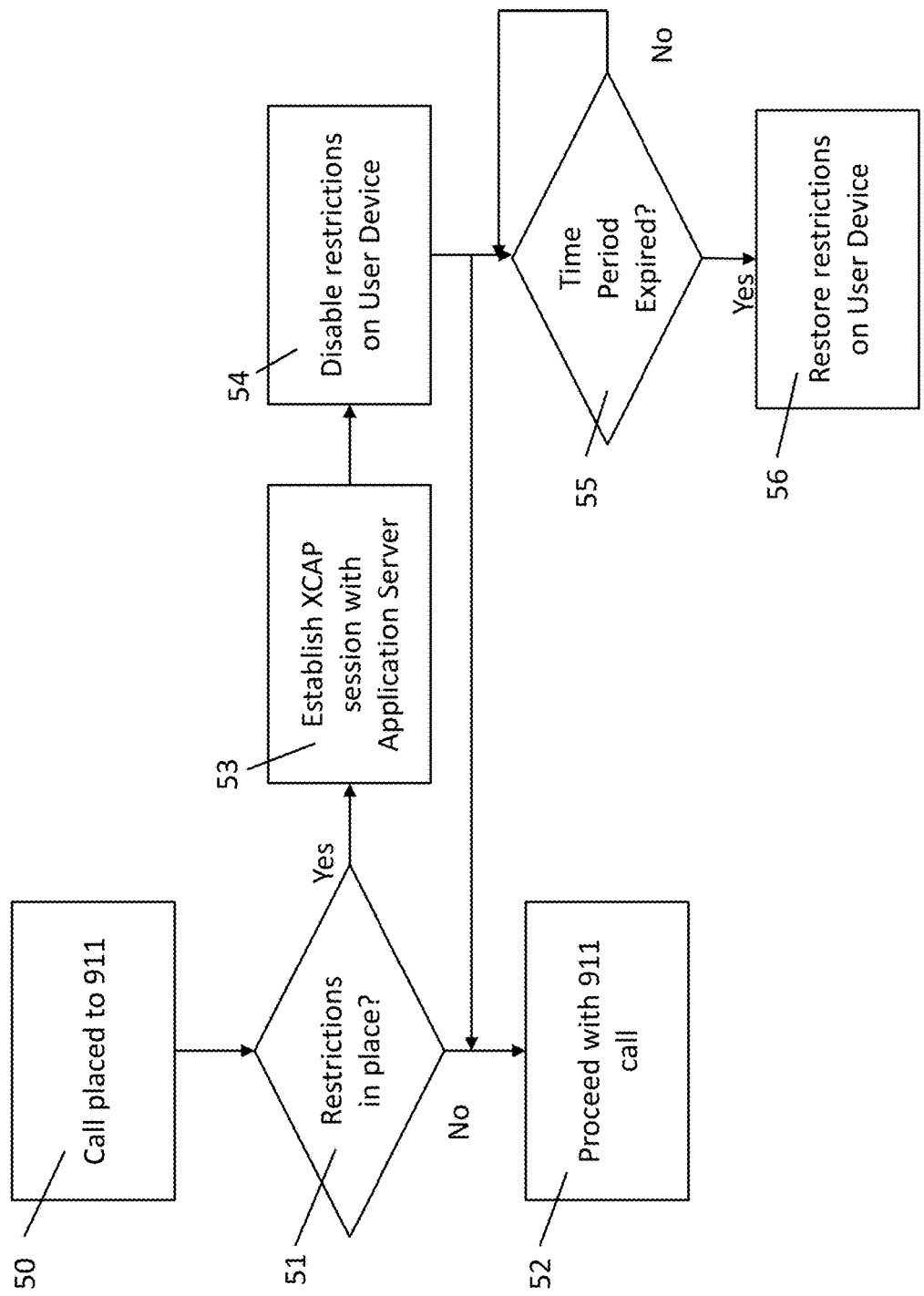
FIG. 6 is an exemplary process flow of a method of operation in accordance with the present disclosure.

With reference to FIG. 6, there is shown an exemplary flow chart in accordance with present disclosure. The process starts at 50 when a call is placed from user device 22 to 911 or other emergency number recognized by the user device 22 as an emergency number. At 51, the determination is made as to whether any restrictions are in place and if so, what is the scope and time period of such restrictions. If there are no restrictions in place, at 52 the 911 call is connected to the PSAP 14. If at 51 there are restrictions in place, a trigger establishes a communication session at 53 between the user device 22 and application server 40, which may, for example, be an MMTel server.

At 54, some or all of the restrictions are removed. For example, restrictions on incoming calls to the user device 22 may be removed. Likewise, restrictions on incoming messaging, either text or multi-media messaging, may be removed. In an aspect, restrictions on outgoing calls or messaging may be removed. The removed restrictions may include all restrictions or uniquely identify which restrictions are to be removed and to/from which numbers. The removal of restrictions may be based on a set time period, which may, for example, be 1 or 2 hours or may be for the duration of the normal restriction period. At 55, a decision is made as to whether there is a set time period and whether that time period has expired. If not, the time period is continually monitored. If the time period is expired, the restrictions are restored at 56. A pop-up graphical user interface or other messaging may be used by the user device or sent to the user device to provide the status of the timer and the duration of the removal will be in place. Additionally, rather than automatically send the trigger upon the dialing of 911, a request may be sent back to the user device 22 to optionally disable the restrictions. Additionally, the termination may be extendable via a message back to the user device 22 in which the user device 22 responds to extend the disablement of call restrictions for a period of time or until commanded to restore. It will be understood that these various options are exemplary only and the election of some options may or may not affect the availability of other options.

In an aspect, certain communications between the PSAP 14 and user device 22 may be initiated by the PSAP 14. For example, a PSAP may have the ability to auto trigger an E911 camera on a user device 22. Such capability may be blocked based on restrictions on user device 22 in place at the time of the auto trigger request. However, if the user device had recently called 911, for example, within a set time period, the trigger would be passed from the PSAP 14 to the user device 22. If the PSAP sent such a request at any other time, the network 12 would remove the request and not deliver the trigger to the user device 22 because there was no recent emergency call initiated by the user device. This is possible because the commercial network knows if the user device 22 had just called 911.

In addition to the device based solution, the present disclosure may also include a solution in which the emergency network is able to trigger the restriction removal. For example, upon receipt of a 911 call on the emergency network from user device 22, the PSAP may trigger the establishment of a communication across the Ut interface between application server 40 and user device 22.

User Device Overview.

Figure 7:
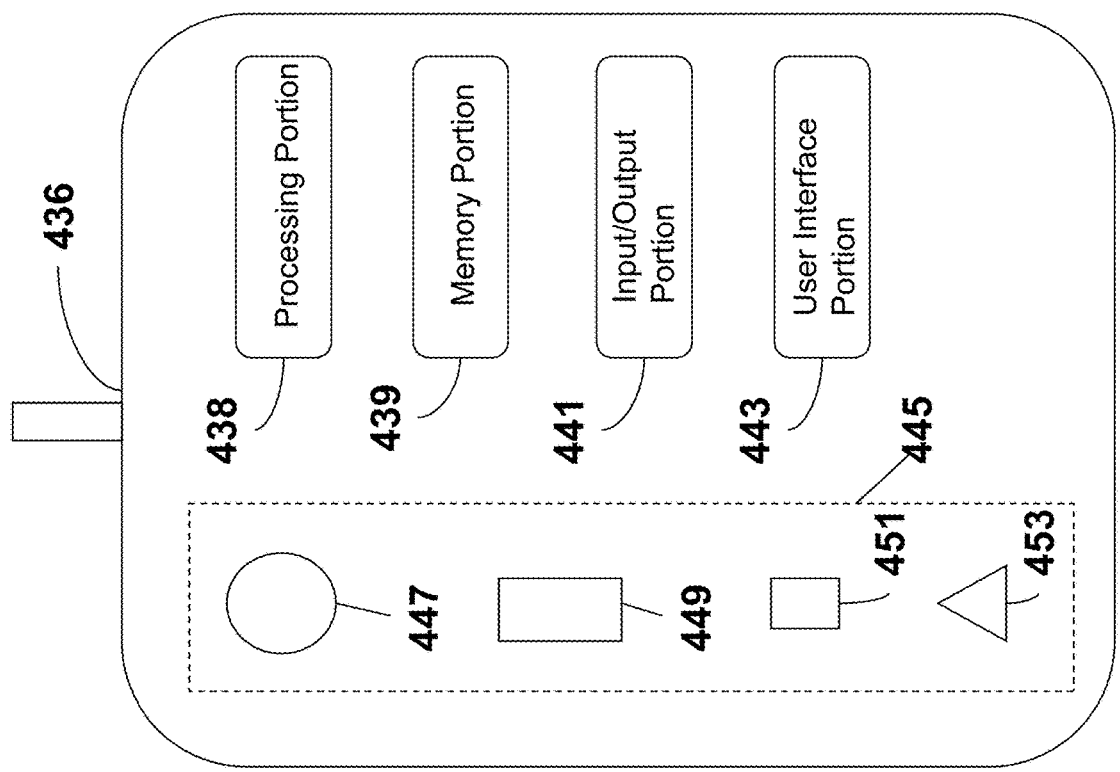
FIG. 7 is a block diagram of an example device that is configurable to be compatible with the present disclosure.

FIG. 7 is a block diagram of an example device 436 that may, for example be a smartphone or other mobile device and which is configurable to receive visual voice mail displays. The device 436 can include any appropriate device, mechanism, software, and/or hardware for distributing connectivity and/or transmission time as described herein. As described herein, the device 436 comprises hardware, or a combination of hardware and software. And, each portion of the device 436 comprises hardware, or a combination of hardware and software. In an example configuration, the device 436 can comprise a processing portion 438, a memory portion 439, an input/output portion 441, a user interface (UI) portion 443, and a sensor portion 445 comprising at least one of a video camera portion 447, a force/wave sensor 449, a microphone 451, a moisture sensor 453, or a combination thereof. The force/wave sensor comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 54 is capable of detecting moisture, such as detecting if the device 436 is submerged in a liquid. The processing portion 438, memory portion 439, input/output portion 441, user interface (UI) portion 443, video camera portion 447, force/wave sensor 449, and microphone 451 are coupled together to allow communications there between (coupling not shown in FIG. 9).

In various embodiments, the input/output portion 441 comprises a receiver of the device 436, a transmitter of the device 436, or a combination thereof. The input/output portion 441 is capable of receiving and/or providing information or other communications with other devices and device types. For example, the input/output portion 441 can include a wireless communications (e.g., 2.5G/3G/4G/5G) SIM card. The input/output portion 441 is capable of receiving and/or sending text information, video information, audio information, control information, image information, data, an indication to initiate a connection, an indication to initiate a transmission, start time information, end time information, interval time information, interval length information, random number value information, connect time information, transmit time information, parsing information, authentication information, or any combination thereof. In an example configuration, the input\output portion 441 comprises a GPS receiver. In an example configuration, the device 436 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 441 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 438 is capable of processing the event capture application as described herein. The processing portion 438, in conjunction with any other portion of the device 436, enables the device 436 to covert speech to text or convert text to speech.

In a basic configuration, the device 436 can include at least one memory portion 439. The memory portion 439 can store any information utilized in conjunction with visual voice mail as described herein. Depending upon the exact configuration and type of processor, the memory portion 40 can be volatile (such as some types of RAM), non-volatile (such as ROM, flash memory, etc.). The device 436 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 439, or a portion of the memory portion 439 is hardened such that information stored therein can be recovered if the device 436 is exposed to extreme heat, extreme vibration, extreme moisture, corrosive chemicals or gas, or the like. In an example configuration, the information stored in the hardened portion of the memory portion 439 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 439 intelligible.

The device 436 also can contain a UI portion 443 allowing a user to communicate with the device 436. The UI portion 443 is capable of rendering any information utilized in conjunction the visual voice mail as described herein. For example, the UI portion 443 can provide means for entering text (including numbers), entering a phone number, rendering text, rendering images, rendering multimedia, rendering sound, rendering video, receiving sound, or the like, as described herein. The UI portion 443 can provide the ability to control the device 436, via, for example, switches, soft keys, voice actuated controls, a touch screen, movement of the device 436, visual cues (e.g., moving a hand in front of a camera on the mobile device 436), or the like. The UI portion 443 can provide visual information (e.g., via a display), audio information (e.g., via speaker), mechanically (e.g., via a vibrating mechanism), or a combination thereof. In various configurations, the UI portion 443 can comprise a display, a touch screen, a keyboard, a speaker, or any combination thereof. The UI portion 443 can comprise means for inputting biometric information, such as, for example, fingerprint information, retinal information, voice information, and/or facial characteristic information. The UI portion 443 can be utilized to enter an indication of the designated destination (e.g., the phone number, IP address, or the like).

In an example embodiment, the sensor portion 445 of the device 436 comprises the video camera portion 447, the force/wave sensor 449, and the microphone 451. The video camera portion 447 comprises a camera (or cameras) and associated equipment capable of capturing still images and/ or video and to provide the captured still images and/or video to other portions of the device 436. In an example embodiment, the force/wave sensor 449 comprises an accelerometer, a tilt sensor, an acoustic sensor capable of sensing acoustic energy, an optical sensor (e.g., infrared), or any combination thereof.

Although not every conceivable combination of components and methodologies for the purposes describing the present disclosure have been set out above, the examples provided will be sufficient to enable one of ordinary skill in the art to recognize the many combinations and permutations possible in respect of the present disclosure. Accordingly, this disclosure is intended to embrace all such alterations, modifications and variations that fall within the spirit and scope of the appended claims. For example, numerous methodologies for defining triggering events for activation of sensor technologies including onboard video cameras to record risky driving behavior may be encompassed within the concepts of the present disclosure.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

Network Description, Software Defined Network Description

Figure 8:
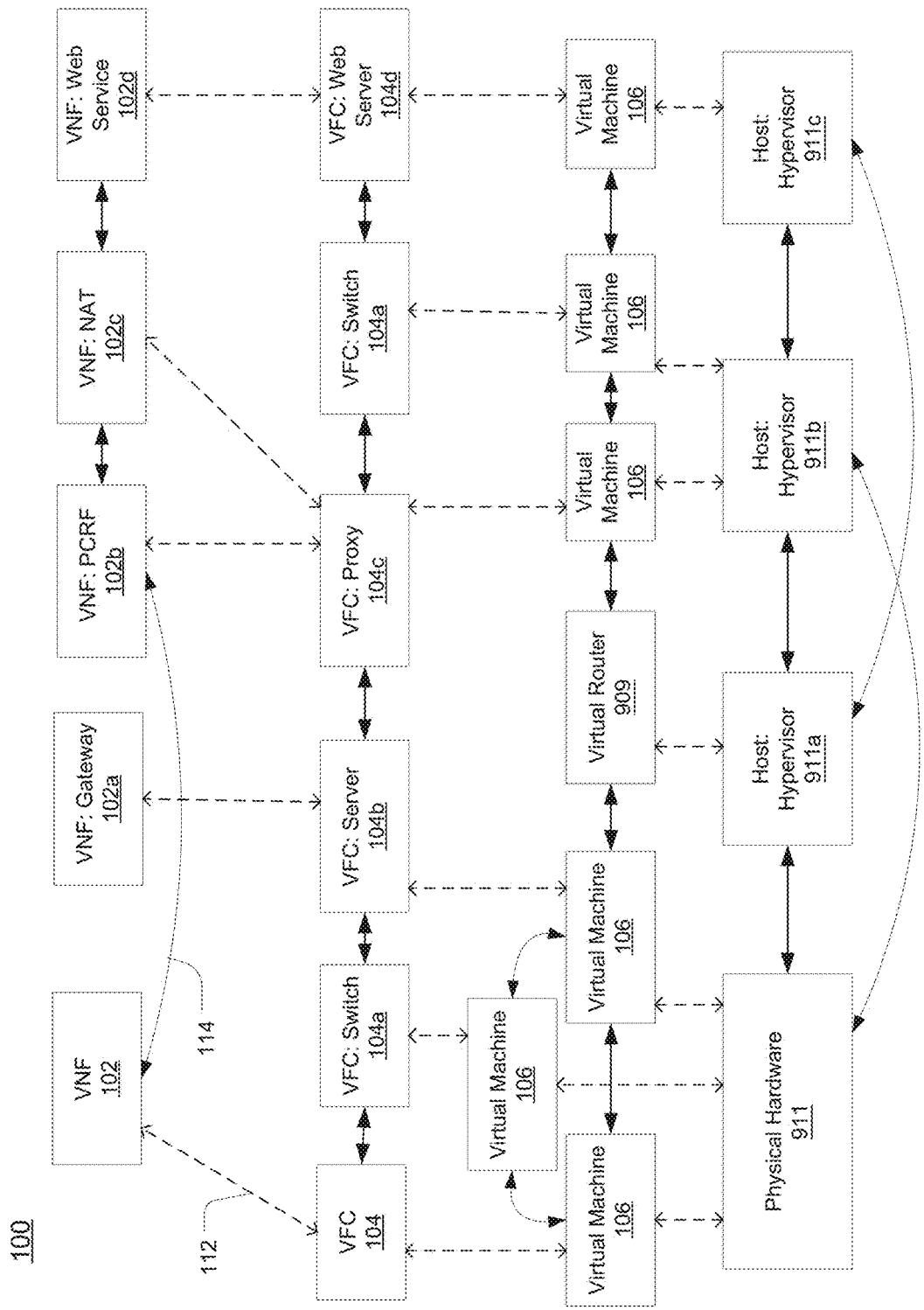
FIG. 8 is a representation of an exemplary software defined network.

FIG. 8 is a representation of an exemplary network 100. Network 100 may comprise a Software Defined Network (SDN)—that is, network 100 may include one or more virtualized functions implemented on general purpose hardware, such as in lieu of having dedicated hardware for every network function. That is, general purpose hardware of network 100 may be configured to run virtual network elements to support communication services, such as mobility services, including consumer services and enterprise services. These services may be provided or measured in sessions Virtual network functions (VNFs) 102 may be able to support a limited number of sessions. Each VNF 102 may have a VNF type that indicates its functionality or role. For example, FIG. 8 illustrates a gateway VNF 102a and a policy and charging rules function (PCRF) VNF 102b. Additionally or alternatively, VNFs 102 may include other types of VNFs. Each VNF 102 may use one or more virtual machines (VMs) 106 to operate. Each VM 106 may have a VM type that indicates its functionality or role. For example, FIG. 8 illustrates multiple VMs 106 that may include MCM VM, an ASM VM, and a DEP VM. Additionally or alternatively, VMs 106 may include other types of VMs. Each VM 106 may consume various network resources from a server 112, such as a resource 108, a virtual central processing unit (vCPU) 108a, memory 108b, or a network interface card (NIC) 108c in FIG. 9. Additionally or alternatively, server 112 may include other types of resources 108.

Figure 9:
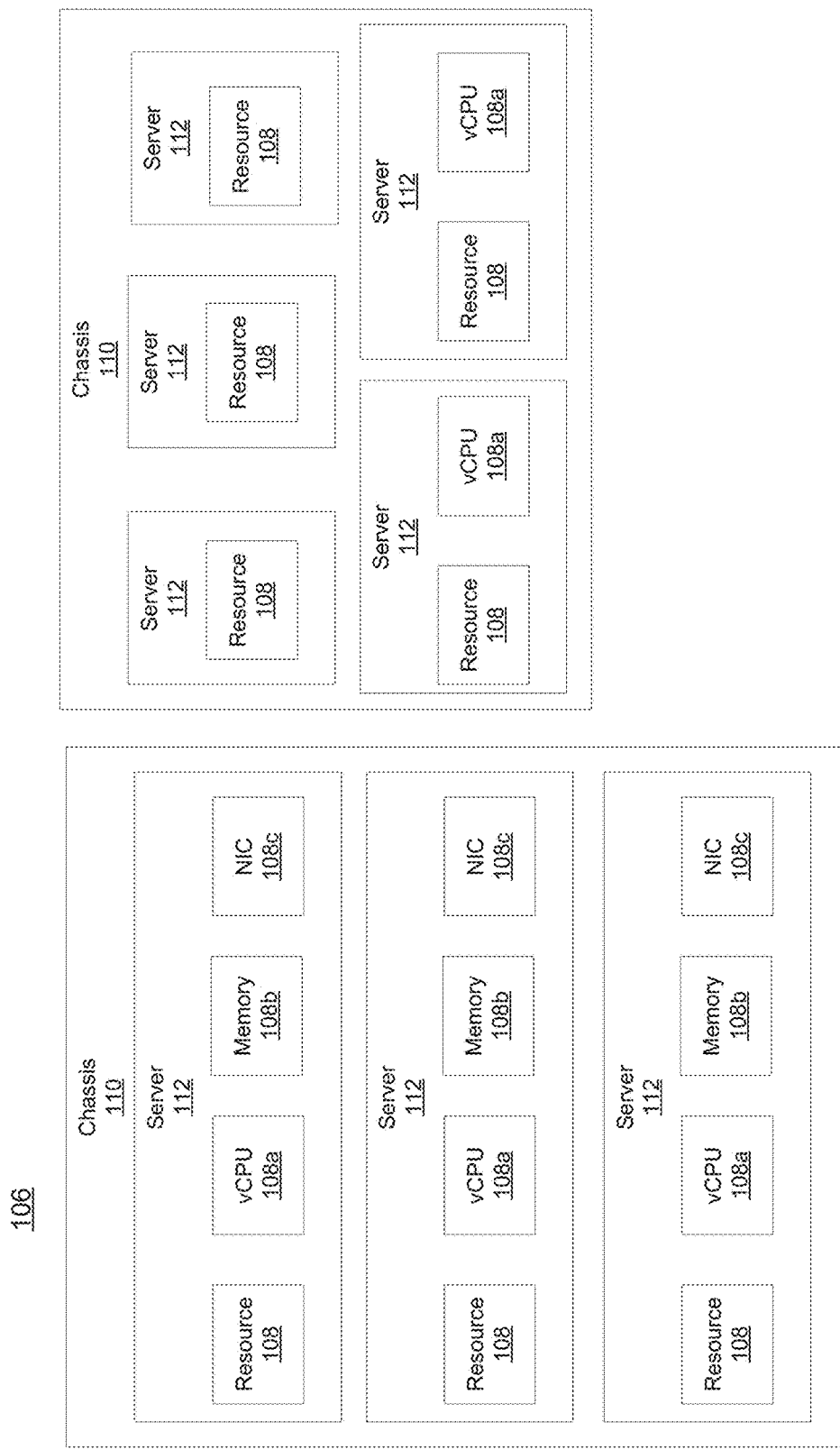
FIG. 9 is a representation of an exemplary hardware platform for a network.

While FIG. 8 illustrates resources collectively contained in hardware platform 910, the configuration of hardware platform 911 may isolate, for example, certain memory 108b from other memory 108*b* FIG. 9 provides an exemplary implementation of hardware platform 910.

Hardware platform 911 may comprise one or more chasses 110. Chassis 110 may refer to the physical housing or platform for multiple servers 112 or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together (not shown) in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together (not shown) in any combination or arrangement.

The characteristics of each chassis 110 and each server 112 may differ. For example, FIG. 9 illustrates that the number of servers 112 within two chasses 110 may vary. Additionally or alternatively, the type or number of resources 108 within each server 112 may vary. In an aspect, chassis 110 may be used to group servers 112 with the same resource characteristics. In another aspect, servers 112 within the same chassis 110 may have different resource characteristics.

Given hardware platform 911, the number of sessions that may be instantiated may vary depending upon how efficiently resources 108 are assigned to different VMs 106. For example, assignment of VMs 106 to particular resources 108 may be constrained by one or more rules. For example, a first rule may require that resources 108 assigned to a particular VM 106 be on the same server 112 or set of servers 112. For example, if VM 106 uses eight vCPUs 108*a*, 1 GB of memory 108*b*, and 2 NICs 108*c*, the rules may require that all of these resources 108 be sourced from the same server 112. Additionally or alternatively, VM 106 may require splitting resources 108 among multiple servers 112, but such splitting may need to conform with certain restrictions. For example, resources 108 for VM 106 may be able to be split between two servers 112. Default rules may apply. For example, a default rule may require that all resources 108 for a given VM 106 must come from the same server 112.

An affinity rule may restrict assignment of resources 108 for a particular VM 106 (or a particular type of VM 106). For example, an affinity rule may require that certain VMs 106 be instantiated on (that is, consume resources from) the same server 112 or chassis 110. For example, if VNF 102 uses six MCM VMs 106, an affinity rule may dictate that those six MCM VMs 106 be instantiated on the same server 112 (or chassis 110). As another example, if VNF 102 uses MCM VMs 106, ASM VMs 106, and a third type of VMs 106, an affinity rule may dictate that at least the MCM VMs 106 and the ASM VMs 1046 be instantiated on the same server 112 (or chassis 110). Affinity rules may restrict assignment of resources 108 based on the identity or type of resource 108, VNF 102, VM 106, chassis 110, server 112, or any combination thereof.

An anti-affinity rule may restrict assignment of resources 108 for a particular VM 106 (or a particular type of VM 106). In contrast to an affinity rule—which may require that certain VMs 106 be instantiated on the same server 112 or chassis 110—an anti-affinity rule requires that certain VMs 106 be instantiated on different servers 112 (or different chasses 110). For example, an anti-affinity rule may require that MCM VM 106 be instantiated on a particular server 112 that does not contain any ASM VMs 106. As another example, an anti-affinity rule may require that MCM VMs 106 for a first VNF 102 be instantiated on a different server 112 (or chassis 110) than MCM VMs 106 for a second VNF 102. Anti-affinity rules may restrict assignment of resources 108 based on the identity or type of resource 108, VNF 102, VM 106, chassis 110, server 112, or any combination thereof.

Within these constraints, resources 108 of servers 112 may be assigned to be used to instantiate VMs 106, which in turn may be used to instantiate VNFs 102, which in turn may be used to establish sessions. The different combinations for how such resources 108 may be assigned may vary in complexity and efficiency. For example, different assignments may have different limits of the number of sessions that can be established given a particular server 112.

For example, consider a session that may require gateway VNF 102*a* and PCRF VNF 102*b*. Gateway VNF 102*a* may require five VMs 106 instantiated on the same server 112, and PCRF VNF 102*b* may require two VMs 104 instantiated on the same server 112. (Assume, for this example, that no affinity or anti-affinity rules restrict whether VMs 106 for PCRF VNF 102*b* may or must be instantiated on the same or different server 112 than VMs 106 for gateway VNF 102*a*.) In this example, each of two servers 112 may have sufficient resources 108 to support 10 VMs 106. To implement sessions using these two servers 112, first server 112 may be instantiated with 10 VMs 106 to support two instantiations of gateway VNF 102*a*, and second server 112 may be instantiated with 9 VMs: five VMs 106 to support one instantiation of gateway VNF 102*a* and four VMs 106 to support two instantiations of PCRF VNF 102*b*. This may leave the remaining resources 108 that could have supported the tenth VM 108 on second server 112 unused (and unusable for an instantiation of either a gateway VNF 102*a* or a PCRF VNF 102*b*). Alternatively, first server 112 may be instantiated with 10 VMs 106 for two instantiations of gateway VNF 102*a* and second server 112 may be instantiated with 10 VMs 106 for five instantiations of PCRF VNF 102*b*, using all available resources 108 to maximize the number of VMs 106 instantiated.

Consider, further, how many sessions each gateway VNF 102*a* and each PCRF VNF 102*b* may support. This may factor into which assignment of resources 108 is more efficient. For example, consider if each gateway VNF 102*a* supports two million sessions, and if each PCRF VNF 102*b* supports three million sessions. For the first configuration—three total gateway VNFs 102*a* (which satisfy the gateway requirement for six million sessions) and two total PCRF VNFs 102*b* (which satisfy the PCRF requirement for six million sessions)—would support a total of six million sessions. For the second configuration—two total gateway VNFs 102*a* (which satisfy the gateway requirement for four million sessions) and five total PCRF VNFs 102*b* (which satisfy the PCRF requirement for 15 million sessions)—would support a total of four million sessions. Thus, while the first configuration may seem less efficient looking only at the number of available resources 108 used (as resources 108 for the tenth possible VM 106 are unused), the second configuration is actually more efficient from the perspective of being the configuration that can support more the greater number of sessions.

To solve the problem of determining a capacity (or, number of sessions) that can be supported by a given hardware platform 911, a given requirement for VNFs 102 to support a session, a capacity for the number of sessions each VNF 102 (e.g., of a certain type) can support, a given requirement for VMs 106 for each VNF 102 (e.g., of a certain type), a given requirement for resources 108 to support each VM 106 (e.g., of a certain type), rules dictating the assignment of resources 108 to one or more VMs 106 (e.g., affinity and anti-affinity rules), the chasses 110 and servers 112 of hardware platform 911, and the individual resources 108 of each chassis 110 or server 112 (e.g., of a certain type), an integer programming problem may be formulated.

First, a plurality of index sets may be established. For example, index set L may include the set of chasses 110. For example, if a system allows up to 6 chasses 110, this set may be:

L={1, 2, 3, 4, 5, 6}, where l is an element of L.

Another index set J may include the set of servers 112. For example, if a system allows up to 16 servers 112 per chassis 110, this set may be:

J={1, 2, 3, . . . , 16}, where j is an element of J

As another example, index set K having at least one element k may include the set of VNFs 102 that may be considered. For example, this index set may include all types of VNFs 102 that may be used to instantiate a service. For example, let

K={GW, PCRF} where GW represents gateway VNFs 102*a* and PCRF represents PCRF VNFs 102*b*.

Another index set I(k) may equal the set of VMs 106 for a VNF 102*k*. Thus, let

I(GW)={MCM, ASM, IOM, WSM, CCM, DCM} represent VMs 106 for gateway VNF 102*a*, where MCM represents MCM VM 106, ASM represents ASM VM 106, and each of IOM, WSM, CCM, and DCM represents a respective type of VM 106. Further, let

I(PCRF)={DEP, DIR, POL, SES, MAN} represent VMs 106 for PCRF VNF 102*b*, where DEP represents DEP VM 106 and each of DIR, POL, SES, and MAN represent a respective type of VM 106.

Another index set V may include the set of possible instances of a given VM 104. For example, if a system allows up to 20 instances of VMs 106, this set may be:

V={1, 2, 3, . . . , 20}, where v is an element of V.

In addition to the sets, the integer programming problem may include additional data. The characteristics of VNFs 102, VMs 106, chasses 110, or servers 112 may be factored into the problem. This data may be referred to as parameters. For example, for given VNF 102*k*, the number of sessions that VNF 102*k* can support may be defined as a function S(k). In an aspect, for an element k of set K, this parameter may be represented by S(k)>=0;

as a measurement of the number of sessions k can support. Returning to the earlier example where gateway VNF 102*a* may support 2 million sessions, then this parameter may be

S(GW)=2,000,000.

VM 106 modularity may be another parameter in the integer programming problem. VM 106 modularity may represent the VM 106 requirement for a type of VNF 102. For example, for k that is an element of set K and i that is an element of set I, each instance of VNF k may require M(k, i) instances of VMs 106. For example, recall the example where

I(GW)={MCM, ASM, IOM, WSM, CCM, DCM}.

In an example, M(GW, I(GW)) may be the set that indicates the number of each type of VM 106 that may be required to instantiate gateway VNF 102*a*. For example,

M(GW, I(GW))={2, 16, 4, 4, 2, 4} may indicate that one instantiation of gateway VNF 102*a* may require two instantiations of MCM VMs 106, 16 instantiations of ACM VM 106, four instantiations of IOM VM 106, four instantiations of WSM VM 106, two instantiations of CCM VM 106, and four instantiations of DCM VM 106.

Another parameter may indicate the capacity of hardware platform 910. For example, a parameter C may indicate the number of vCPUs 108*a* required for each VM 106 type i and for each VNF 102 type k. For example, this may include the parameter C(k, i).

For example, if MCM VM 106 for gateway VNF 102*a* requires 20 vCPUs 108*a*, this may be represented as

C(GW, MCM)=20.

However, given the complexity of the integer programming problem—the numerous variables and restrictions that must be satisfied—implementing an algorithm that may be used to solve the integer programming problem efficiently, without sacrificing optimality, may be difficult.

Figure 10:
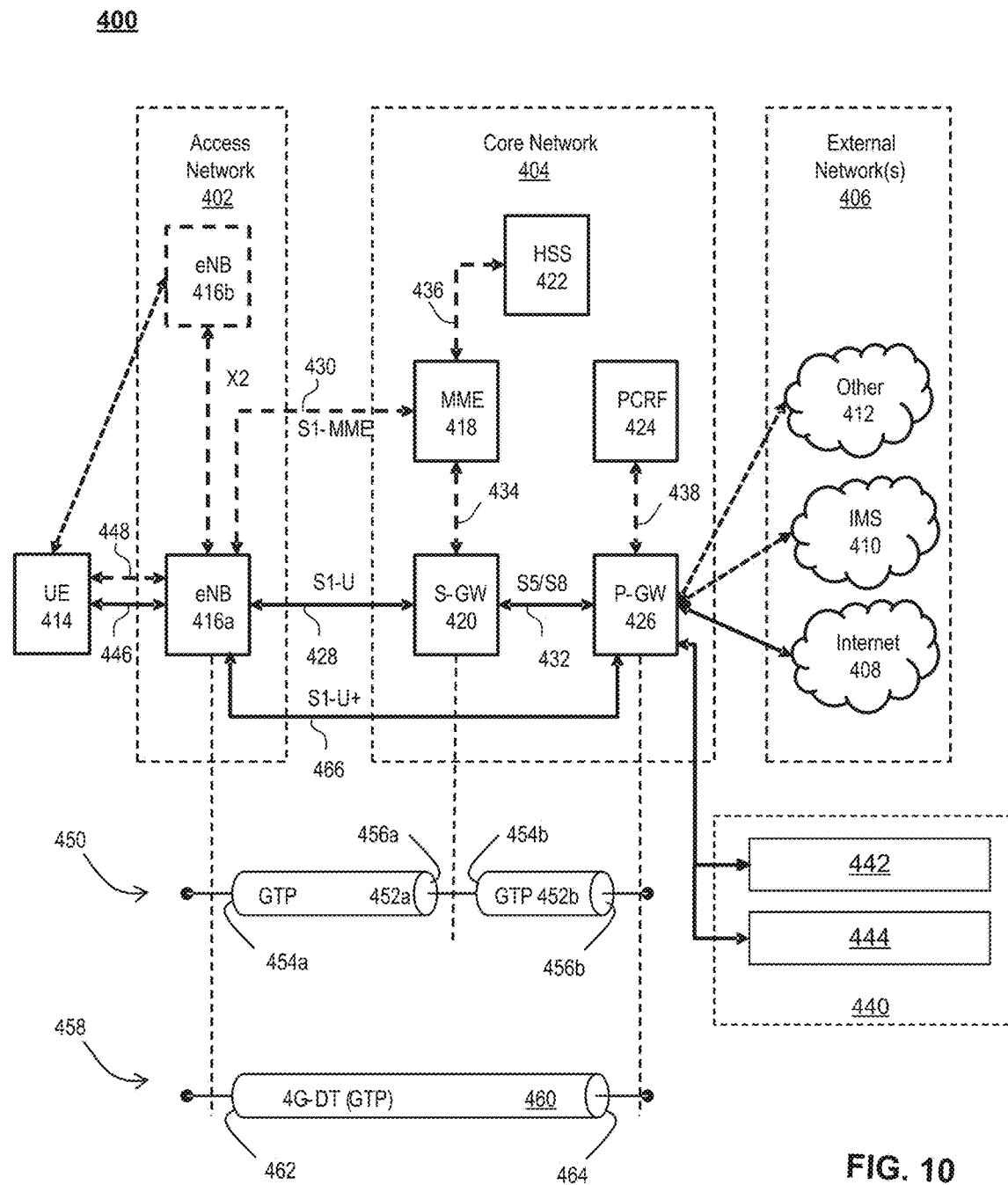
FIG. 10 is an illustration of a functional block diagram depicting one example of a Long Term Evolution-Evolved Packet System (LTE-EPS) network architecture.

FIG. 10 illustrates a functional block diagram depicting one example of an LTE-EPS network architecture 400 that may be at least partially implemented as an SDN. Network architecture 400 disclosed herein is referred to as a modified Long Term Evolution/Evolved Packet System (LTE-EPS) architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an Evolved Packet Core (EPC) or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 406 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as User Equipment (UE) 414, and one or more wireless access nodes, or base stations 416*a*, 416*b*. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, Voice over IP (VoIP), streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers (virtual connections between UEs and Packet Gateways, PGWs), to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as Mobility Management Entity (MME) 418, Serving Gateway (SGW) 420, Home Subscriber Server (HSS) 422, Policy and Charging Rules Function (PCRF) 424 and Packet Data Network Gateway (PGW) 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 10. In other words, either or both of access network 402 and the core network 404 can include additional network elements that are not shown, such as various routers, switches and controllers. In addition, although FIG. 10 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 10. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between evolved Node B (eNodeB, eNB) 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456*b* corresponding to an S5-U address of PGW 426 (referred to herein as the PGW S5-U address).

In at least some embodiments, first tunnel solution 450 is referred to as a two tunnel solution, e.g., according to the General Packet Radio Service (GPRS) Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each Packet Data Protocol (PDP) context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416*a* and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416*a* and PGW 426, by way of SGW 420. That is, SGW 420 can serve a relay function, by relaying packets between two tunnel endpoints 416*a*, 426. In other scenarios, direct tunneling solution 458 can forward user data packets between eNB 416*a* and PGW 426, by way of the S1 U+ interface 466, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416*a*. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 11:
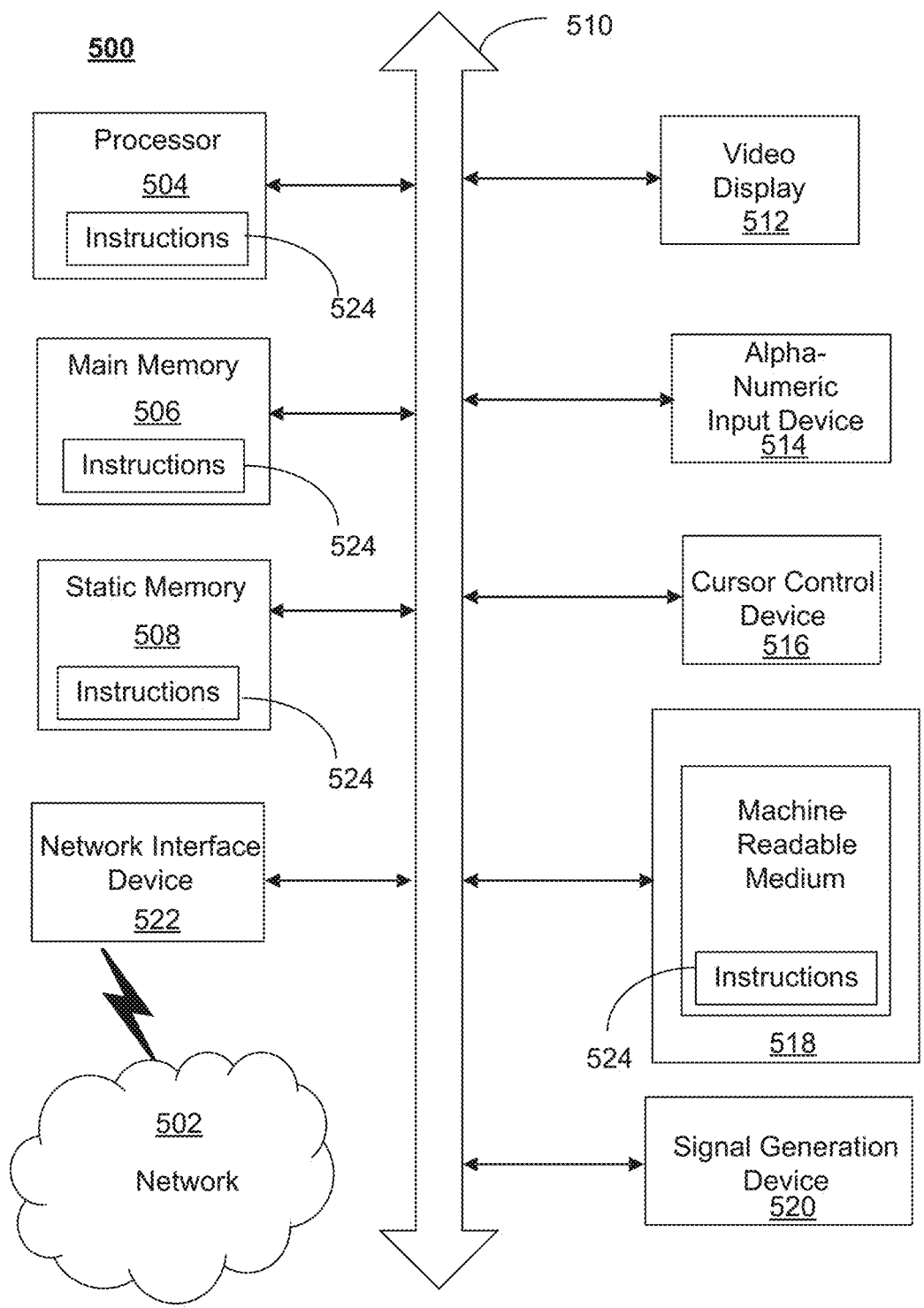
FIG. 11 depicts an exemplary diagrammatic representation of a machine in the form of a computer system.

FIG. 11 depicts an exemplary diagrammatic representation of a machine in the form of a computer system 500 within which a set of instructions, when executed, may cause the machine to perform any one or more of the methods described above. One or more instances of the machine can operate, for example, as processor 504 for UE 414, eNB 416, MME 418, SGW 420, HSS 422, PCRF 424, PGW 426 and other devices. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 518 having instructions 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 12:
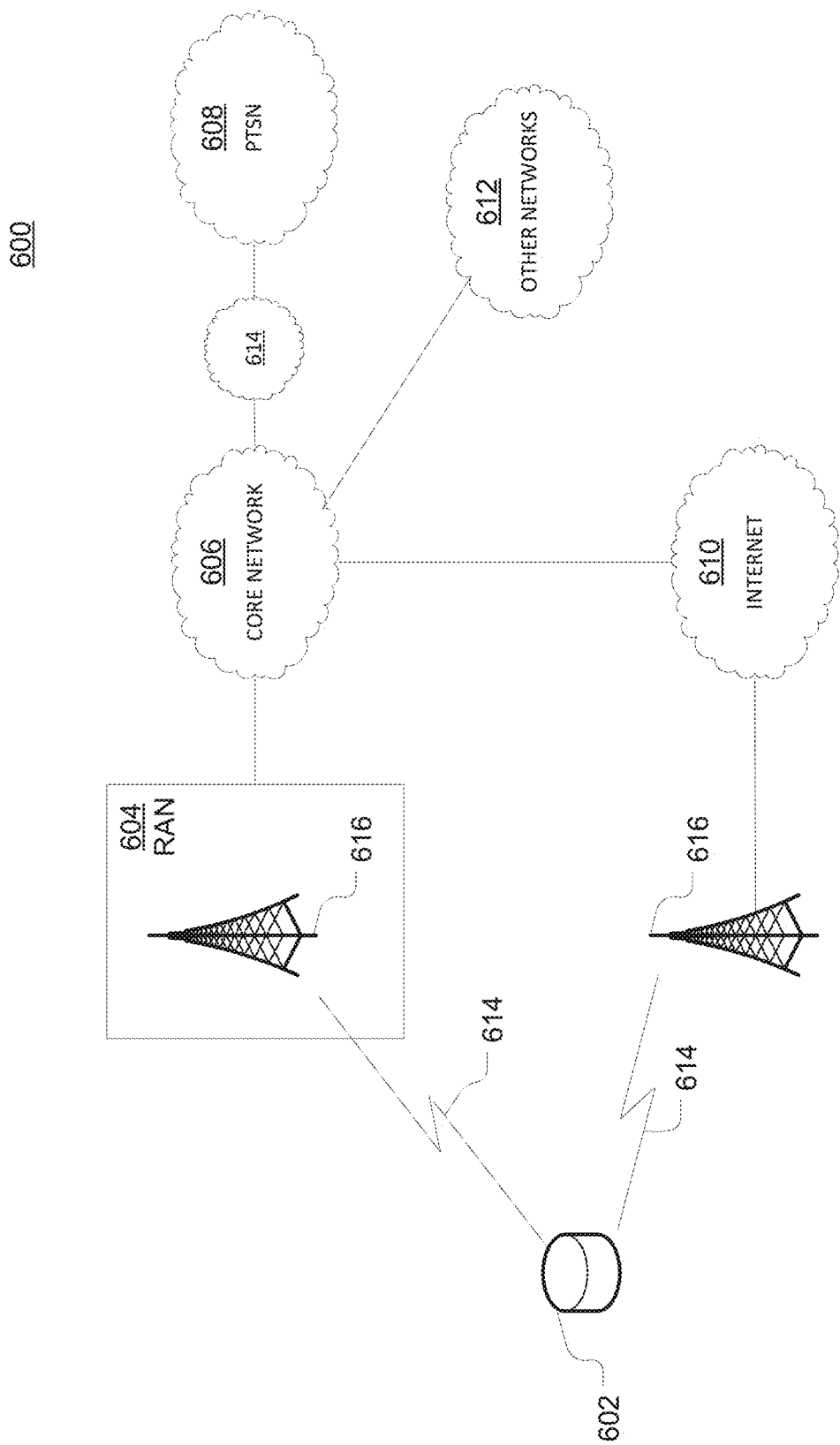
FIG. 12 illustrates a base station with a direct connection to Internet.

As shown in FIG. 12, telecommunication system 600 may include wireless transmit/receive units (WTRUs) 602, a Radio Access Network (RAN) 604, a core network 606, a public switched telephone network (PSTN) 608, the Internet 610, or other networks 612, though it will be appreciated that the disclosed examples contemplate any number of Wireless Transmit/Receive Units (WTRUs), base stations, networks, or network elements. Each WTRU 602 may be any type of device configured to operate or communicate in a wireless environment. For example, a WTRU may comprise a mobile device, network device or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., radio frequency (RF), microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as Code Division Multiple Access (CDMA), Time-Division Multiple Access (TDMA), Frequency Division Multiple Access (FDMA), Orthogonal FDMA (OFDMA), Single-Carrier FDMA (SC-FDMA), or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 802.16 (i.e., Worldwide Interoperability for Microwave Access (WiMAX)), CDMA2000, CDMA2000 1×, CDMA2000 Evolution-Data Optimized (EV-DO), Interim Standard 2000 (IS-2000), Interim Standard 95 (IS-95), Interim Standard 856 (IS-856), GSM, Enhanced Data rates for GSM Evolution (EDGE), Global System for Mobile Communication (GSM) EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 802.11 to establish a wireless local area network (WLAN). As another example, base station 616 and associated WTRUs 602 may implement a radio technology such as IEEE 802.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 12, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 12, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or Internet Protocol (IP) in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 13:
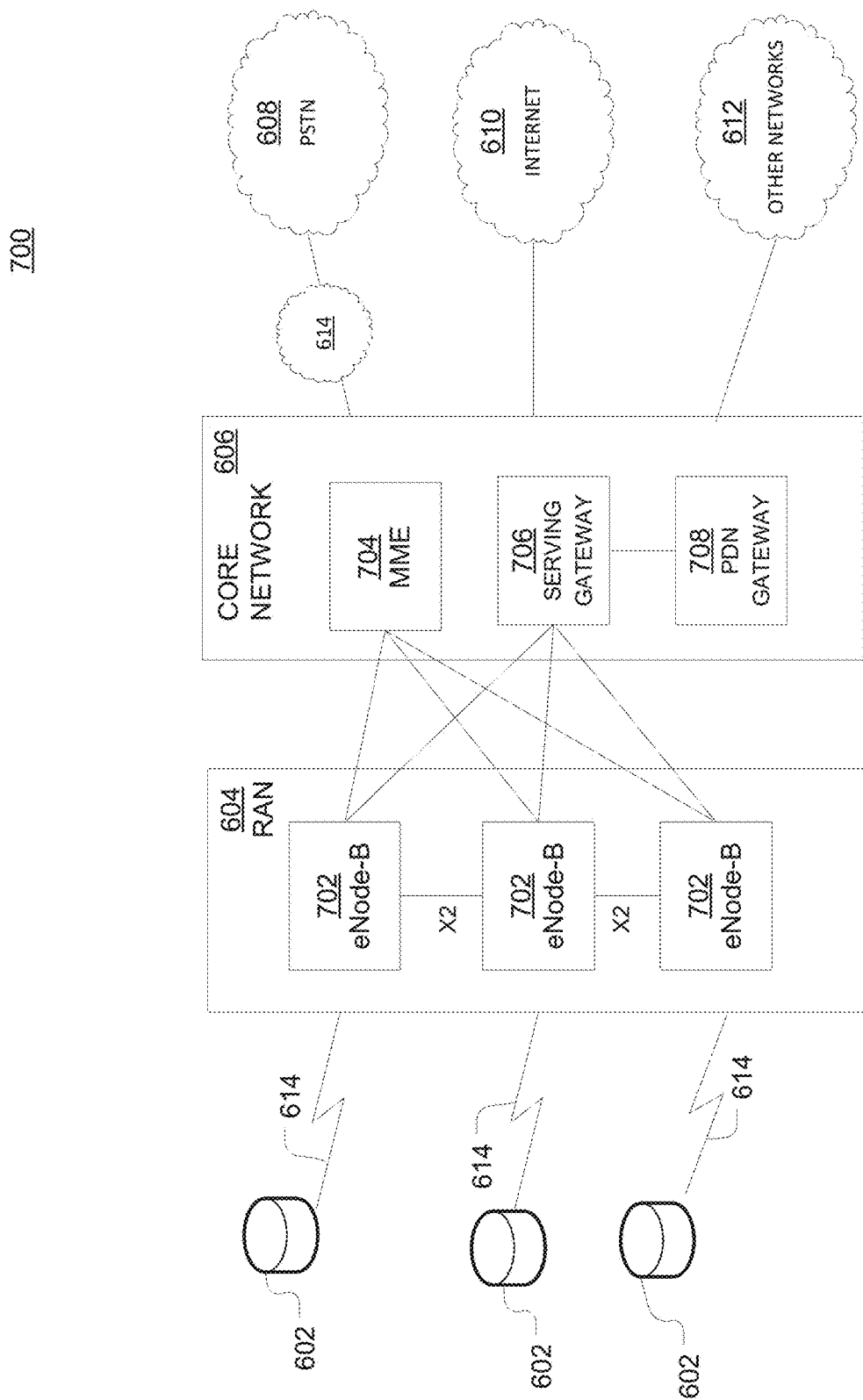
FIG. 13 is an example system including RAN and core network.

FIG. 13 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 13 eNode-Bs 702 may communicate with one another over an X2 interface.

Core network 606 shown in FIG. 13 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or Wideband CDMA (WCDMA).

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 14:
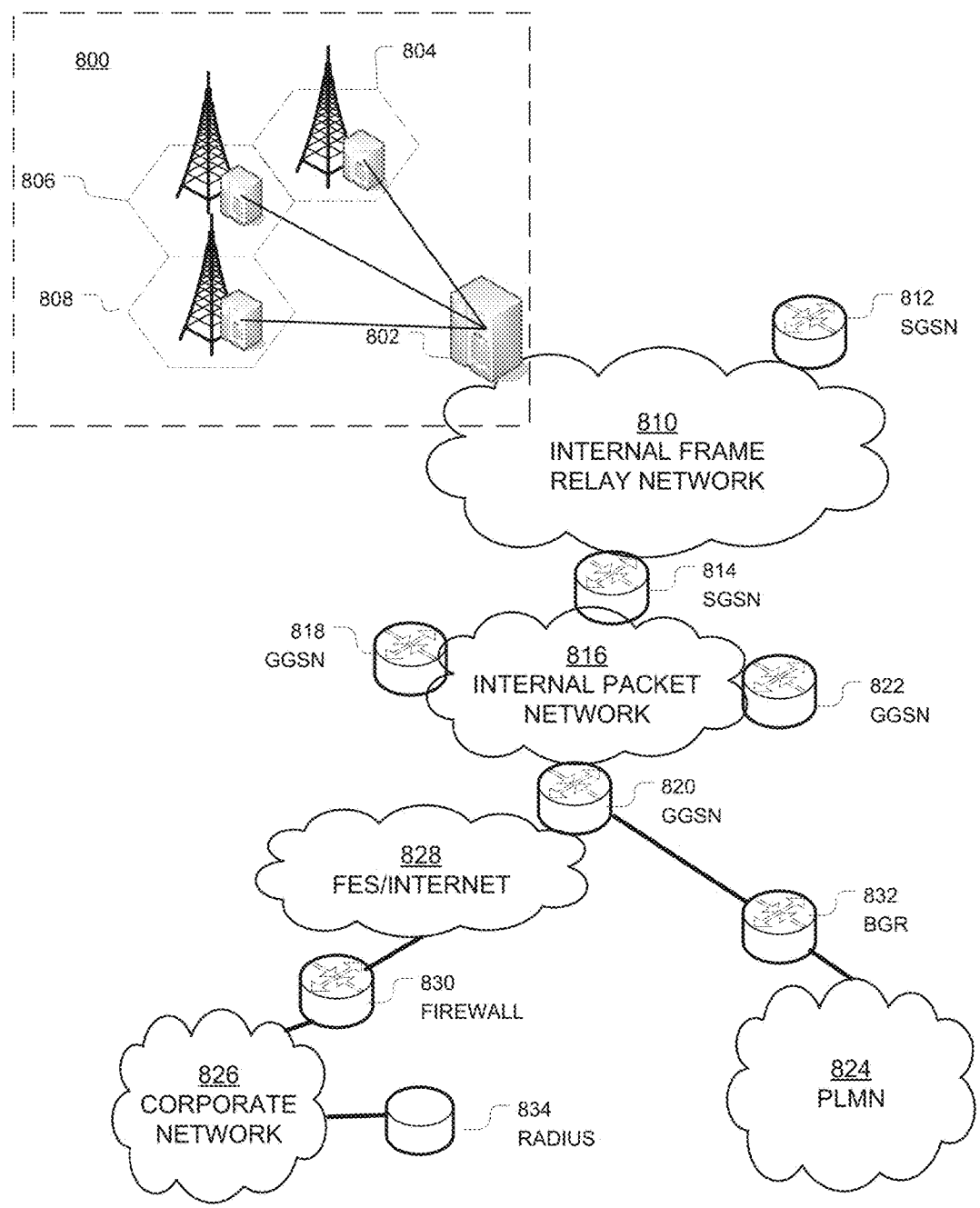
FIG. 14 illustrates an overall block diagram of an example packet-based mobile cellular network environment.

FIG. 14 depicts an overall block diagram of an example packet-based mobile cellular network environment, such as a GPRS network as described herein. In the example packet-based mobile cellular network environment shown in FIG. 14, there are a plurality of base station subsystems (BSS) 800 (only one is shown), each of which comprises a base station controller (BSC) 802 serving a plurality of Baseband Transceiver Stations (BTSs), such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a Serving GPRS Support Node (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as Public Land Mobile Network (PLMN) 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a border gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 15:
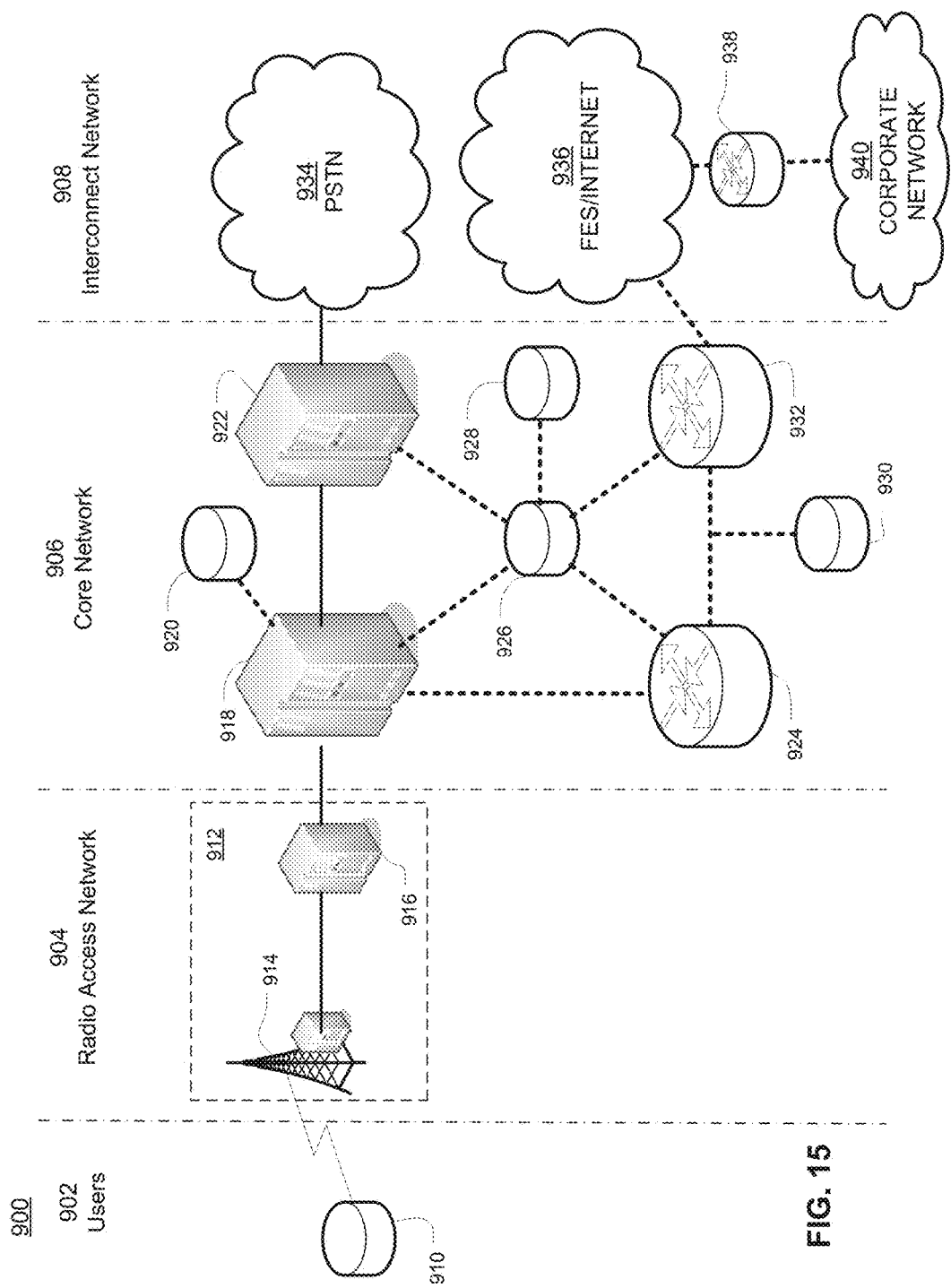
FIG. 15 illustrates an architecture of a typical General Packet Radio Service (GPRS) network.

FIG. 15 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, firewall 938, or a corporate network 940.'

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

Home Location Register (HLR) 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 15, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 938, to reach corporate network 940.

Figure 16:
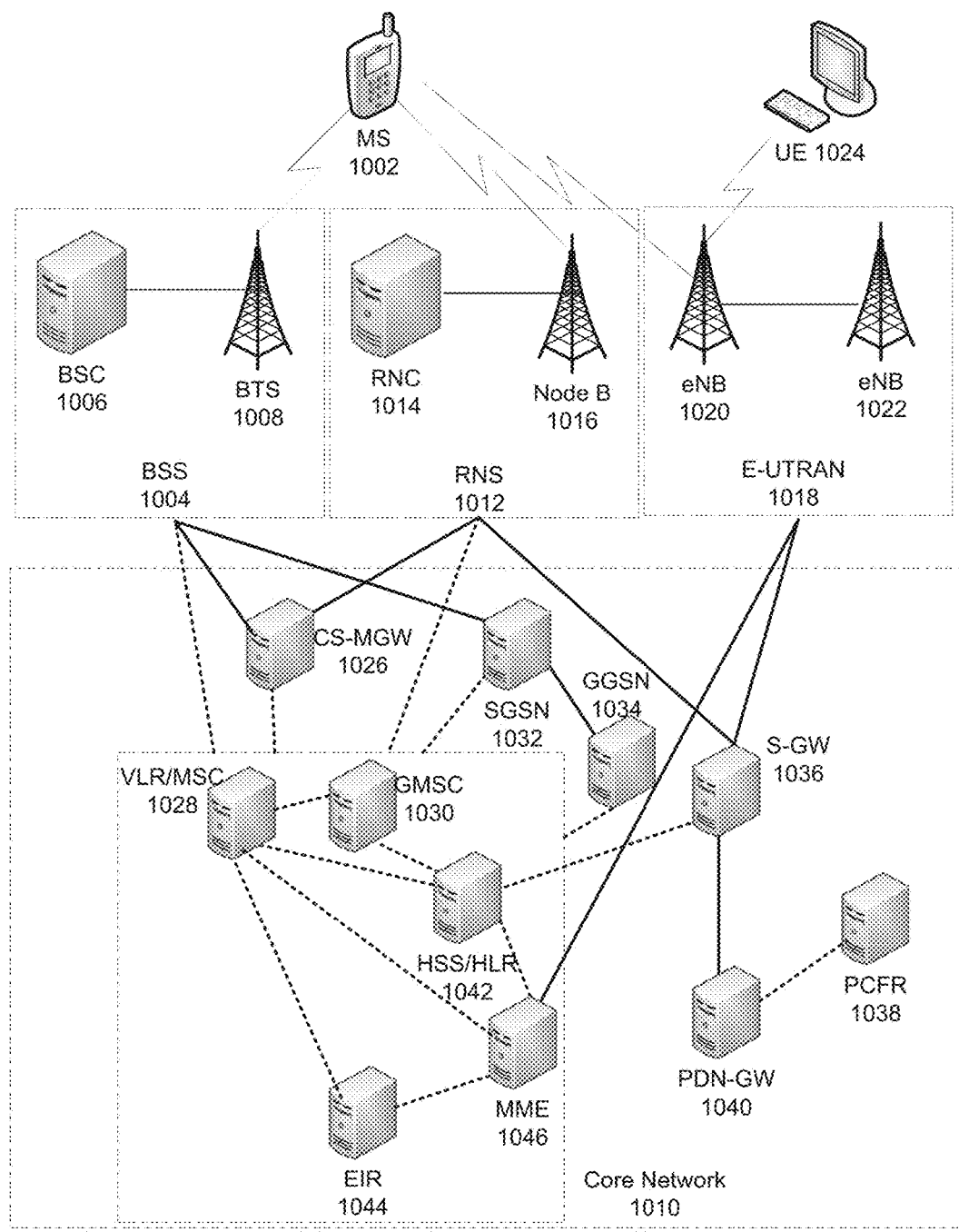
FIG. 16 illustrates a Public Land Mobile Network (PLMN) block diagram view of an example architecture that may be replaced by a telecommunications system.

FIG. 16 illustrates a PLMN block diagram view of an example architecture that may be replaced by a telecommunications system. In FIG. 16, solid lines may represent user traffic signals, and dashed lines may represent support signaling. MS 1002 is the physical equipment used by the PLMN subscriber. For example, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched Media Gateway (MGW) function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS/HLR 1042 is a database for user information and stores subscription data regarding MS 1002 or UE 1024 for handling calls or data sessions. Networks may contain one HSS/HLR 1042 or more if additional resources are required. Example data stored by HSS 1042 include, but is not limited to, user identification, numbering or addressing information, security information, or location information. HSS/HLR 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. Gateway Mobile Services Switching Center (GMSC) server 1030 may serve as a connection to alternate GMSC servers for other MSs in larger networks.

Equipment Identity Register (EIR) 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and an internet protocol are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple Machine-to-Machine (M2M) and Internet of Things (IoT) sensors/devices—through enhanced wireless management.

While examples of a telecommunications system in which emergency data can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, Compact Disc-Read-Only Memory devices (CD-ROMs), Digital Versatile Discs, or, Digital Video Discs (DVDs), hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, over the air (OTA), or firmware over the air (FOTA), wherein, when the program code is received and loaded into and executed by a machine, such as an Erasable Programmable Read-Only Memory (EPROM), a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

Although not every conceivable combination of components and methodologies for the purposes describing the present disclosure have been set out above, the examples provided will be sufficient to enable one of ordinary skill in the art to recognize the many combinations and permutations possible in respect of the present disclosure. Accordingly, this disclosure is intended to embrace all such alterations, modifications and variations that fall within the spirit and scope of the appended claims. In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

While example embodiments have been described in connection with various computing devices/processors, the underlying concepts can be applied to any computing device, processor, or system capable of performing the processing as described herein. The methods and apparatuses of the present disclosure, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for distributing connectivity and/or transmission time. A computer-readable storage medium, as described herein is an article of manufacture, and thus, is not to be construed as a transitory signal. In the case of program code execution on programmable computers, which may, for example, include server 40, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems of the present disclosure may be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, a controller, or the like, the machine becomes an apparatus for use in reconfiguration of systems constructed in accordance with the present disclosure. When implemented on a general-purpose processor, the program code combines with the processor to provide a unique apparatus that operates to invoke the functionality described herein.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

Any service marks or trademarks ("Marks") incorporated or referenced herein are included as illustrative examples only and such Marks are presumed to be owned by their respective owners and no claim is made to any such Marks by virtue of being referenced herein. The disclosure and appended claims are not intended to be limited by the use of such Marks as illustrative examples.

What is claimed:

1. A method comprising:
    Initiating an emergency call using a network having an Internet Protocol Multimedia Subsystem (IMS);
    Responsive to the initiating step, generating a trigger, wherein the trigger comprises a request to suspend a call restriction associated with a user device;
    and Transmitting the trigger using a Ut interface from a user device to an application server to suspend the call restriction;
    receiving a response from the application server wherein the response comprises a time period;
    wherein the call restriction is enabled at the end of the time period.

2. The method of claim 1 wherein the trigger is incorporated into an XCAP message.

3. The method of claim 1 wherein the trigger is transmitted at one of a beginning of the emergency call, during the emergency call and at an end of the emergency call.

4. The method of claim 3 wherein the time period is measured from the one of the beginning of the emergency call, during the emergency call and at the end of the emergency call.

5. The method of claim 1 wherein the server is a commercial network node.

6. An apparatus comprising:
    an input/output system for communicatively coupling the apparatus to an input device;
    a processor communicatively coupled to the input/output system; and
    a memory storing instructions that cause the processor to effectuate operations when executed, the operations comprising:
    Initiating an emergency call using a network having an Internet Protocol Multimedia Subsystem (IMS);
    Responsive to the initiating step, generating a trigger, wherein the trigger comprises a request to suspend a call restriction associated with a user device;
    Transmitting the trigger using a Ut interface from a user device to an application server to suspend the call restriction;
    wherein the operations further comprise receiving a response from the application server wherein the response comprises a time period;
    wherein the call restriction is enabled at the end of the time period.

7. The apparatus of claim 6 wherein the trigger is transmitted at one of a beginning of the emergency call, during the emergency call and at an end of the emergency call.

8. The apparatus of claim 7 wherein the time period is measured from the one of the beginning of the emergency call, during the emergency call and at the end of the emergency call.

9. The apparatus of claim 6 wherein the server is a commercial network node.

10. A method comprising:
    Receiving, by an application server, a message from a user device over a Ut interface in a network having an Internet Protocol Multimedia Subsystem (IMS) wherein the message comprises a trigger;
    Responsive to the receiving step, causing a call restriction to be disabled;
    Sending a response message to the user device wherein the response message comprises a time period; and Re-enabling the call restriction at the conclusion of the time period.

11. The method of claim 10 further comprising logging an identification of the user device into a caller log.

12. The method of claim 11 further comprising causing the call restriction to be suspended based on the caller log even if no trigger is received from the user device.

* * * * *